United States Patent [19]

Ziarno

[11] Patent Number: 5,506,393
[45] Date of Patent: Apr. 9, 1996

[54] DONATION KETTLE ACCEPTING CREDIT CARD, DEBIT CARD, AND CASH DONATIONS, AND DONATION KETTLE NETWORK

[76] Inventor: Witold A. Ziarno, 4519 S. St. Louis Ave., Chicago, Ill. 60632

[21] Appl. No.: 199,072

[22] Filed: Feb. 22, 1994

Related U.S. Application Data

[63] Continuation-in-part of Ser. No. 194,204, Feb. 8, 1994, which is a continuation-in-part of Ser. No. 127,770, Sep. 28, 1993, which is a continuation-in-part of Ser. No. 117,909, Sep. 7, 1993, abandoned.

[51] Int. Cl.⁶ .................................................. G06K 5/00
[52] U.S. Cl. .................................................. 235/380
[58] Field of Search ............................... 235/375, 380, 235/379, 462

[56] References Cited

U.S. PATENT DOCUMENTS

| | | | |
|---|---|---|---|
| 4,634,845 | 1/1987 | Hale et al. | 235/350 |
| 4,689,478 | 8/1987 | Hale et al. | 235/380 |
| 4,775,784 | 10/1988 | Stark | 235/380 |
| 4,782,217 | 11/1988 | Soza et al. | 235/380 |
| 5,206,488 | 4/1993 | Teicher | 235/380 |
| 5,221,838 | 6/1993 | Gutman et al. | 235/379 |
| 5,291,003 | 3/1994 | Aunet et al. | 235/381 |
| 5,294,782 | 3/1994 | Kumar | 235/462 |

*Primary Examiner*—John Shepperd
*Assistant Examiner*—Michael G. Lee
*Attorney, Agent, or Firm*—Lobato Law Offices; Witold A. Ziarno

[57] ABSTRACT

A donation kettle that permits a contributor to make a donation that consists of a display, keyboard, a surface for collecting a cash donation, a credit card and/or debit card donation processor. The donation kettle associates a donation with an account of a contributor, tallies information regarding a number of donations, and stores information regarding a donation, and a plurality of donations. The donation kettle is part of a donation kettle network which consists of a donation kettle, a terminal, and a communication link between the donation kettle and the terminal. The present invention also provides a method of processing a donation obtained via a donation kettle by a card account processor. A docking station on a donation kettle is provided for a card donation processor.

12 Claims, 9 Drawing Sheets

DONATION KETTLE ACCEPTING CREDIT CARD, DEBIT CARD, AND CASH DONATIONS, AND DONATION KETTLE NETWORK

CROSS-REFERENCE TO RELATED APPLICATIONS (Claiming Benefit Under 35 U.S.C. 120)

This application is a continuation-in-part application of U.S. application, Ser. No. 08/194,204, filed Feb. 8, 1994, which is a continuation in part application of U. S. application, Ser. No. 08/127,770, filed Sep. 28, 1993, which is a continuation-in-part of U.S. application, Ser. No. 08/117,909, filed Sep. 7, 1993, now abandoned by Witold A. Ziarno.

BACKGROUND OF THE INVENTION

This invention relates to a donation kettle and donation kettle network for gathering a donation for a charitable organization, and the like; and, more particularly, it relates to a donation kettle that allows a contributor to make a credit card donation, a debit card donation, or a cash donation, and accepts, stores, and displays information regarding the donation.

As is well known, a charitable organization is typically assisted in the gathering of a donation and a contributor in the making of a donation through the use of a donation kettle. As used herein, the term "donation kettle" refers to a container used for collecting donations. Versions of collection kettles include containers made of metals, wood, or other material appropriate to construct a container into which a donation can be deposited. Collection kettles are commonly constructed in the shape of a pail with a handle.

Donation kettles are commonly located at or near shopping centers, stores, and the like. Generally, the presence of donation kettles increases near a holiday season. By way of example, the Salvation Army utilizes donation kettles in order to collect donations for its various charitable activities.

Donation kettles are generally attached to stands. Stands are made of steel, iron, bronze, and other metals and used to support a donation kettle at a height that accommodates the making of a cash or coin donation. Stands frequently have a sign located on the top of the stand to indicate the charitable organization collecting the donation.

A contributor visits a donation kettle commonly to make a donation to a charitable organization. A contributor drops a donation into the donation kettle. A donation is most often in the form of cash or coin.

A primary problem exists with respect to security. Throughout history, charitable organizations have taken precautions to secure donation kettles and protect them from theft. In order to secure these donation kettles, charitable organizations have padlocked donation kettles and securely mounted them to stands. Even given these protective measures, theft of the contents of a donation kettle is becoming a more common occurrence. Consequently, there exists a need for a method of making a donation at a donation kettle that, by way of example, will decrease the monetary loss associated with the theft of a donation kettle.

A further problem exists if the contributor only has with him a bill that is larger than the bill the contributor prefers to donate, e.g. a one hundred dollar bill. The member may choose not to donate the larger bill since his preference may have been to donate a smaller bill, e.g. a five, ten, or twenty dollar bill. There is virtually no way for the member to donate the bill he wishes to donate unless he obtains change from some source.

A further shortcoming of submitting a cash donation is that a contributor cannot receive a tax benefit for his donation since there is no way to associate a particular cash donation with the contributor who made it. Consequently, the contributor may choose not to submit the donation since it does not carry a tax benefit. There exists a need for a donation kettle that provides a secure way of making a donation, allows a contributor to make a donation that is his donation preference, and allows the contributor to obtain a tax benefit.

Yet another shortcoming exists if a contributor has with him no cash but has either a debit card or credit card. In this scenario, the contributor is foreclosed from making a donation since a donation kettle cannot accept a debit card donation or credit card donation. Hence, there exists a need for a donation kettle that allows a contributor to make a debit card donation or credit card donation and thereby increases the number of donations received by a charitable organization by accepting debit card or credit card donations rather than simply cash donations.

Moreover, another shortcoming of making a donation at a donation kettle or a plurality of donation kettles is that there is no integration of information associated with a plurality of individual donations. Consequently, there exists a need for a donation kettle network that integrates a plurality of individual donations made at a donation kettle at varying times and/or places.

It is, therefore, an object of the present invention to provide a donation kettle which allows a contributor to make a credit and debit card donation, and/or associates a debit or credit card donation with an account of a contributor of a charitable organization and/or credits that contributor's card account accordingly.

It is yet another object of the present invention to provide a donation kettle network that can collect, integrate, and display information associated with an individual donation or a plurality of individual donations and provide useful quantitative data.

SUMMARY OF THE INVENTION

These and other objects of the present invention are achieved in a donation kettle accepting credit card, debit card, and cash donations, and donation kettle network.

The present invention provides a donation kettle for accepting a credit card and/or debit card donation, tallying the amount of card donations accepted, and collecting, analyzing, and displaying information regarding the donation.

The present invention also provides a donation kettle that provides a docking station for an integrated card donation processor and/or a portable card processor.

The present invention further yet provides a method for processing a donation obtained via a donation kettle by a card account processor.

The present invention provides a donation kettle network including a plurality of donation kettles. These and other objects will become apparent in the course of a detailed description of the invention.

DETAILED DESCRIPTION OF THE INVENTION

Figure 1:
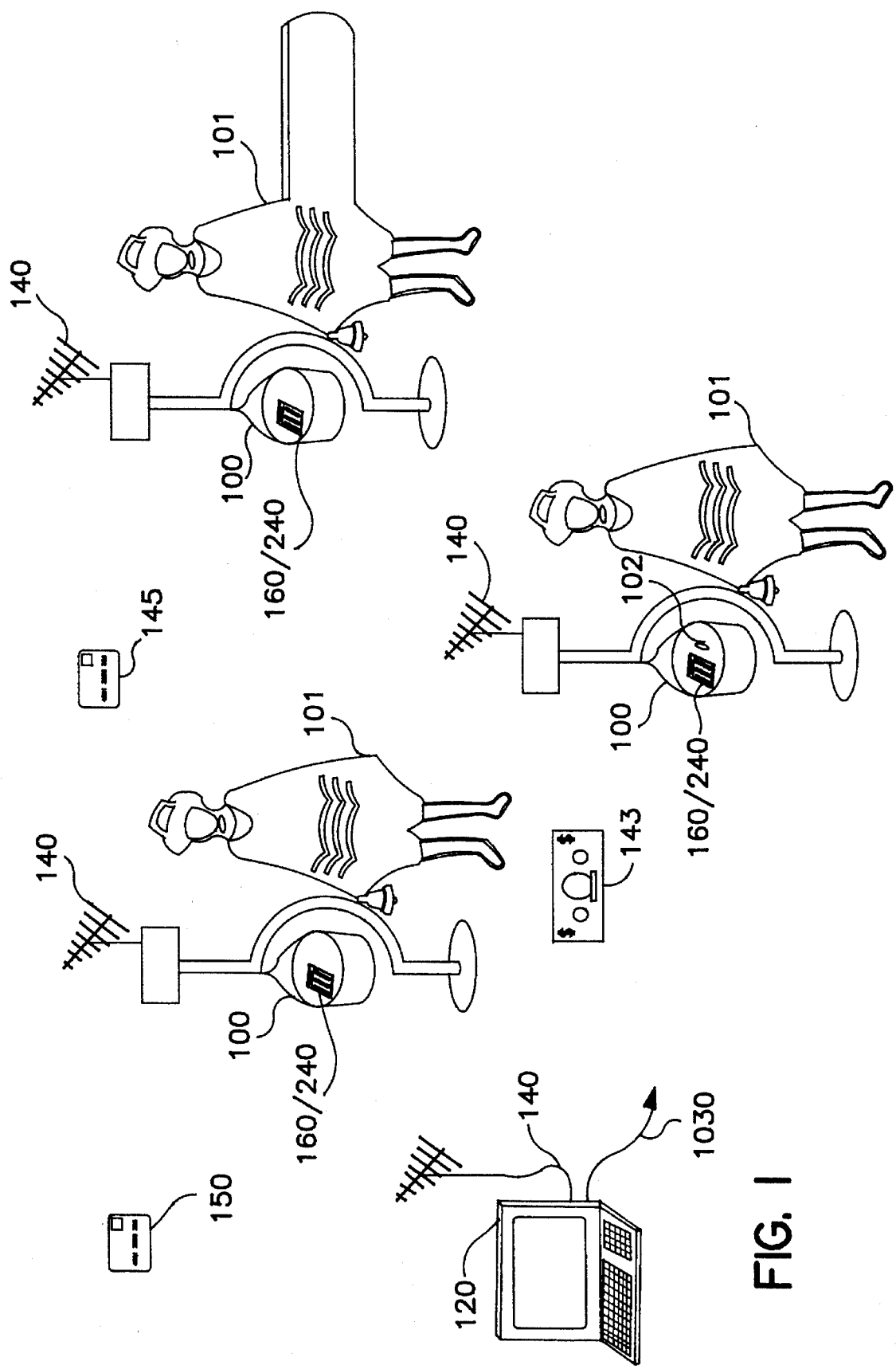
FIG. 1 is an overall system configuration of a donation kettle network according to the present invention.

FIG. 1 is an overall configuration of a donation kettle network according to the present invention.

In one embodiment, a donation kettle 100 gathers a cash donation 143. In a second embodiment, a donation kettle 100 gathers a credit card donation 145. In a third embodiment, a donation kettle 100 gathers a debit card 150 donation. The term "card" when used without the descriptors "credit" or "debit" refers to both a credit card and a debit card and includes IC Cards ("smart cards"), magnetically striped cards, and other forms of information bearing cards. The term "card" also contemplates a private label card issued or maintained by a charitable organization or an affiliate of a charitable organization, and a prepaid card that can be purchased by cash, check, credit, or debit card.

A donation kettle 100 collects and provides information about a contributor and a donation. Using a communication link 140, preferably an RF (radio frequency) communication link, an infra-red or other free-propagating electromagnetic energy communication link, a donation kettle 100 communicates the information about a contributor to terminal 120 in one embodiment.

In an alternate embodiment, the donation kettle 100 first stores the information about the contributor and/or the donation it has accepted in a data storage 302 (FIG. 1a), and then at a latter time communicates it to terminal 120 via communication circuitry 990 (FIG. 1a) and a communication link 140, e.g. after a single session of donation collection. Terminal 120 might be located on-site at a charitable organization or at some remote location, by way of example, at an accountant's office. Terminal 120 then communicates the information about the contributor and/or the donation via a communication link 1030, which by way of example, might include a telephone hookup, with a card account processor database 1032 (FIG. 2b), or the like.

In yet another embodiment, donation kettle 100 communicates information about the contributor, and/or the donation directly via communication link 1030, by way of example, a telephone hookup, thereby bypassing terminal 120 to a card account processor 1032 (FIG. 2b), and the like. The card account of the contributor is appropriately charged the amount of the donation, or debited for the donation, as appropriate, and the account of the charitable organization is augmented respectively.

Figure 1A:
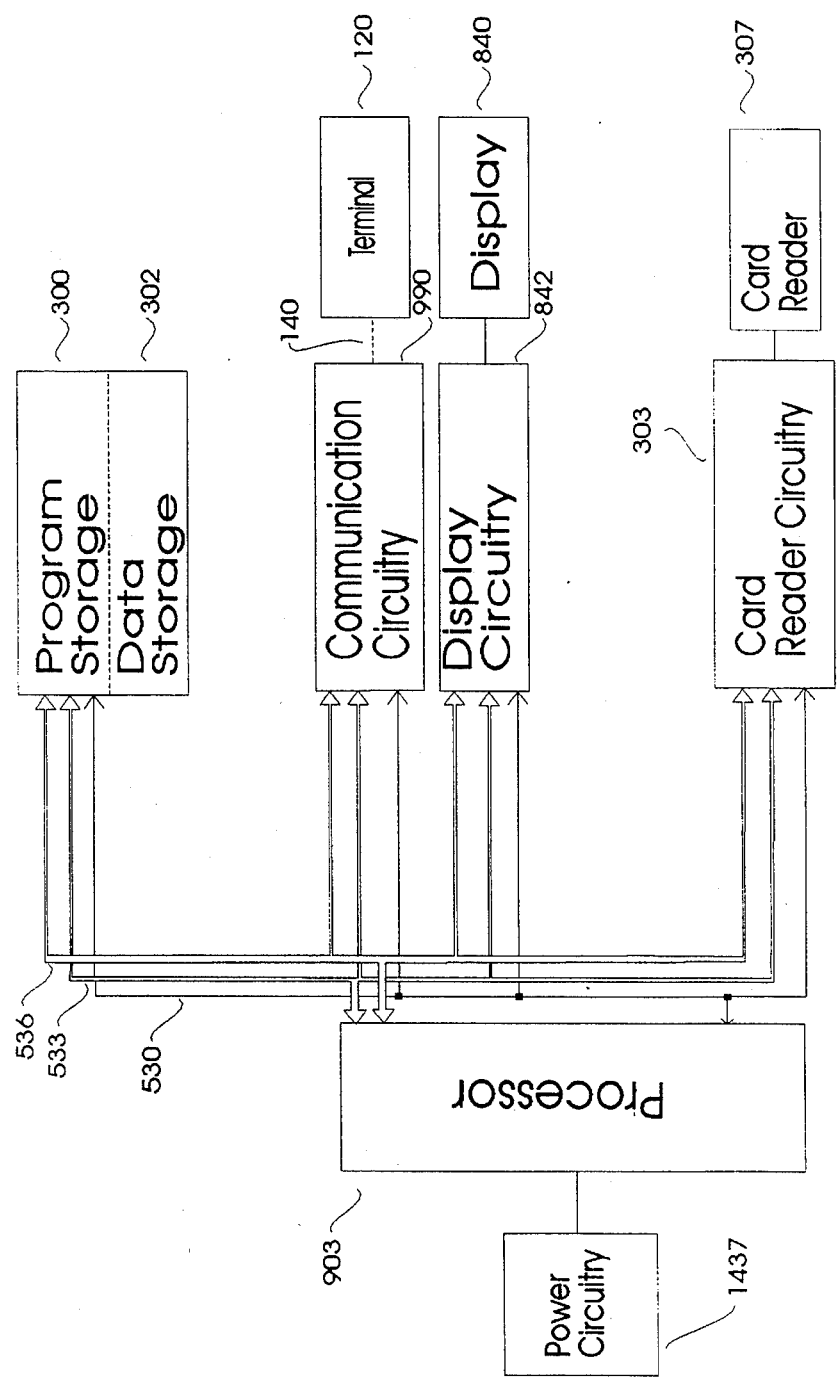
FIG. 1a is a general schematic block diagram of an embodiment of a donation kettle with a card reader and associated circuitry, a display and associated circuitry, communication circuitry, and a terminal.

In yet a further embodiment, a first donation kettle 100 communicates contributor information, status information, and/or donation information to a second donation kettle 100 via communication circuitry 990 (FIG. 1a) and a communication link 140. In yet another embodiment, a plurality of donation kettles 100 communicate contributor card information and/or donation amount information to terminal 120 via communication link 140. Terminal 120 communicates contributor card information and/or donation information to a card account processor database 1032 (via link 1030) (FIG. 2b). In yet an alternate embodiment, a plurality of donation kettles 100 communicates contributor card information and donation information to a modem for transmission to a card account processor database.

By way of further example, a donation kettle 100 contains a credit card donation processor 160, and/or a debit card donation processor 240. Such a processor directly utilizes a cellular communication link, or other standard telephone hookup. The present invention further contemplates that reader 307 (FIG. 1a) can read IC cards, PCMCIA cards, and/or coded cards. Donation kettle 100 stores a contributor's card account and donation information in data storage 302 (FIG. 1a). After a donation session, communication link 1030 is connected directly to the processor 160/240, and communication circuitry 990 via communication link 1030 transfers the contributor and donation information to a card account processor database, and the like. The card account of the contributor of the charitable organization is appropriately charged or debited the amount of the donation and the account of the charitable organization is augmented respectively.

It will further be appreciated that theft of a donation kettle 100 that contains a card processor 160/240 may be less likely since there is no cash to be stolen but rather electronic card information which will be difficult, if not impossible, for a thief to utilize.

The present invention also provides a method of processing a donation obtained via donation kettle 100 by a card account processor. A card donation processor 160/240 obtains card account information and/or information representative of a donation amount from a contributor. The card account processor receives card account information and/or the donation amount information via a direct communication link, by way of example, link 140, and/or an indirect link, e.g. link 140 and link 1030 via terminal 120. In one embodiment, terminal 120 contains a modem and related circuitry. The card account processor enters a debit representative of the donation amount to an account of an contributor, and enters a credit representative of said donation amount to an account of a charitable organization. Card account and/or donation information is submitted in batch to a card account processor in one embodiment. Similarly, card account and/or donation information collected via a worship terminal, worship terminal network, offering plate, and/or offering plate network can be transmitted in batch to a card account processor.

The present invention includes a set of software routines which run on donation kettle 100 to tally a plurality of donations. In an alternate embodiment, a set of software routines run on terminal 120. A software routine tallies a credit card 145 donation, a debit card 150 donation, a cash donation 143, and combinations thereof, for a single contributor or a plurality of contributors. Moreover, a software routine performs a number of arithmetic functions including but not limited to, by way of example, addition, subtraction, multiplication, division, as well as statistical calculations. A software routine is linked to commercially available accounting programs in one embodiment.

In conjunction with a printer, a donation kettle 100 may be used to generate a report commonly used for accounting, including but not limited to a summary of total donations generated, a monthly statement, a histogram, a donation average per contributor, sub-group of contributors, or group of contributors.

In yet a further embodiment, a donation kettle 100 contains a statistical software routine which runs on processing circuitry 903 (FIG. 1a). In an alternate embodiment, the statistical software routines run on the terminal 120. The statistical software routine collects donation data from the card reader 307 and associated circuitry 303 (FIG. 1a), and communicates it to storage 302 in one embodiment. A statistical software routine retrieves donation data, contributor data, petition data, intention data, usage data, and/or data concerning the status of a donation kettle 100, from data storage 302 and performs arithmetic and statistical calculations thereon.

There are various types of statistical information that can be associated with a donation, a contributor, or usage of a donation kettle 100, and analyzed by a statistical software routine. By way of example, one measure of the frequency of use of donation kettle 100 is the amount and/or number of donations generated at the donation kettle 100 and/or the time, date, and number of contributor's utilizing the donation kettle 100. Donation kettle 100, in one embodiment, or terminal 120, in another embodiment, generates a report measuring the frequency of use of a particular donation kettle 100 or group of donation kettles 100, the donation habits of a contributor or a group of contributors, and the number of contributors as measured by the number of donations given, via the above described statistical software routine, and associated hardware. The routine might also include an interface with a commercially available computer program, a customized accounting computer program, and/ or a statistics computer program.

FIG. 1a is a general schematic block diagram of one embodiment of a donation kettle 100 of the present invention which includes a card reader 307 and associated circuitry 303, power source 1437, and communication circuitry 990. Although display circuitry 842 and display 840 is shown in this general embodiment of the invention, display 840 and/or display circuitry 842 need not be included in specific embodiments of the invention.

In the present embodiment, processing circuitry 903 includes a microprocessor. However, multiple microprocessors, or a plurality of dedicated microprocessors may also be used. Processing circuitry 903 and associated circuitry are powered through power source 1437. Processing circuitry 903 interfaces with associated circuitry via an address bus 536, data bus 533, and control bus 530. Specifically, upon detection by the card reader 307 that a donation is being made, card reader circuitry 303 interrupts processing circuitry 903. Circuitry 903 responds to the interrupt by reading the buffered donation information. Circuitry 903 then stores the donation information in storage 302. In one embodiment, circuitry 903 also adds the new donation information to a running total of donation information stored in storage 302.

A variety of links and associated circuitry are used in the present invention. By way of example, link 140 is a serial link and associated circuitry in one embodiment, an RS-232 link and associated circuitry in another embodiment, modem circuitry in communication with circuitry 990 in yet another embodiment, or an RF or infra-red link and associated circuitry in another embodiment.

A variety of additions can be added to the embodiment of processing circuitry 903 illustrated in FIG. 1a. By way of example, a keyboard and associated circuitry, a touch sensitive screen and associated circuitry, an optical character recognition reader and associated circuitry, an electronic signature line and associated circuitry, a card reader and associated circuitry, a coin reader and associated circuitry, a bill dispenser and associated circuitry, a display and associated circuitry, a coin dispenser and associated circuitry, a sound board and associated circuitry, a speaker and associated circuitry, a docking station for a card reader and associated circuitry, a debit card processor, a currency validator, a currency discriminator, a currency acceptor, a coin discriminator, a coin validator, or a combination thereof, can be added.

Terminal 120 drives a printer in one embodiment to produce a hard copy of a report representing data sent to terminal 120 via communication circuitry 990. Processing circuitry 903 communicates contributor, usage, status, and/ or donation information to communication circuitry 990 which drives a printer to print out data via a wired link, for example, an RS-232 cable. Similarly, donation kettle 100 can use a serial link to drive a printer directly via communication circuitry 990.

Display circuitry 842 includes a buffer and LED drive circuitry which processing circuitry 903 can write information into in one embodiment. Display circuitry 842 responds to data written into the buffer by displaying that information via control bus 530. A donation kettle 100 of the present invention may include a single or multiple displays, e.g. (FIG. 2).

Moreover, power source 1437 is a battery power source in one embodiment. Preferably, the battery is a rechargeable source, and is located on the donation kettle 100 so as to be easily accessible during replacement or recharging thereof. In another embodiment, power source 1437 includes a hardwired power supply. In yet another embodiment power source 1437 is located in stand 153 (FIG. 2). In yet a further embodiment power source 1437 is located in portable card processor 160/240, e.g. FIG. 3.

Figure 2:
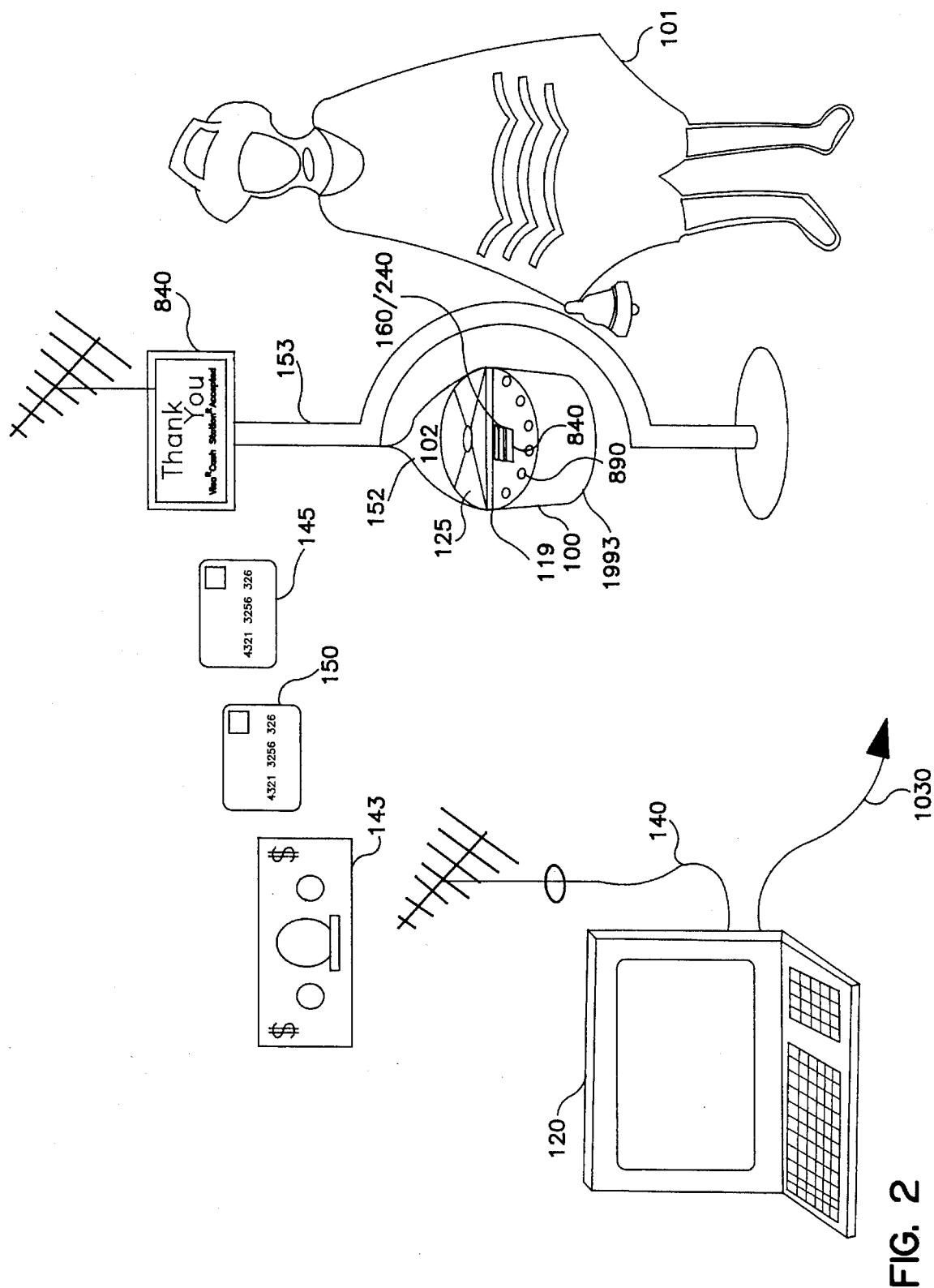
FIG. 2 is a perspective view of an embodiment of an exemplary donation kettle with a card donation processor, a keyboard, a speaker, a display, a terminal, a cash donation, a credit card donation, a debit card donation, and an attendant.

FIG. 2 is a perspective view of a donation kettle 100 with a card donation processor 160/240, a keyboard 890, a display 840, a speaker 1993, a hinge 119, a surface 125, a slot 102, a handle 152, a stand 153, an attendant 101, terminal 120, a cash donation 143, a credit card donation 145, and a debit card donation 150. In one embodiment, a donation kettle 100 may have only one of the above additions. In an alternate embodiment, a donation kettle 100 has a combination of the above additions.

A contributor feeds a coin donation (not pictured) or cash donation 143 into slot 102 which forms part of surface 125 in one embodiment. Slot 102 is an opening formed in the side or top of donation kettle 100 which provides a channel to a center retaining area 200 (FIG. 5) of donation kettle 100.

One embodiment of donation kettle 100 contains a credit card donation processor 160 and a debit card donation processor 240, e.g. processor 160/240. The present invention contemplates that donation kettle 100 might only contain a credit card donation processor 160. Alternatively, the present invention also contemplates that donation kettle 100 might only contain a debit card donation processor 240. In yet a further embodiment, the present invention contemplates that both a credit card donation processor 160 and a debit card donation processor 240 might be located on donation kettle 100 at different physical locations.

Card processor 160/240 includes a card slot defining member which defines a card slot in one embodiment. A contributor swipes or inserts a credit card 145 into or through card slot of a credit card donation processor 160. Alternatively, a contributor swipes or inserts a debit card 150 through a card slot of a debit card donation processor 240. Moreover, as used herein, the term "card donation processor" when used without the descriptors "credit" or "debit" refers to either a credit card processor, debit card processor, or both a credit and debit card processor. The term "processor" also refers to a card terminal.

By way of further example, in an embodiment, donation kettle 100 contains a card processor 160/240 that reads smart cards, e.g. PCMCIA cards, JEIDA/PCMCIA compliant memory cards, IC cards, GEC Card Technology Ltd. IC cards, West Midlands, U.K., and/or Gemplus Card Services memory and microprocessor cards. The present invention also contemplates that use of contactless IC cards, e.g. such as those available from Mitsubishi Electric UK Ltd, Hatfield UK, and Oakwood Design, Letchworth UK, and the like.

In a preferred embodiment, donation kettle 100 has both a credit card donation processor 160 and a debit card donation processor 240 utilizing a single processor that discriminates between the type of donation made. An exemplary credit and debit card processor 160/240 is disclosed in U.S. Pat. No. 5,012,077 which is incorporated herein by reference as if fully set forth.

In one embodiment, the card donation processor 160/240 communicates with key pad 890. By way of example, upon receiving the communication that a card donation is to be given, key pad 890 reveals a key associated with a cash denomination. By way of example, the key associated with a cash denomination might appear to disclose a one, five, ten or twenty dollar symbol as described below. The contributor presses the key associated with a cash denomination that is the preferred amount of his donation. By way of further example, key pad 890 is a programmable key pad in one embodiment. In another embodiment, key pad 890 is a touch sensitive screen. In yet a further embodiment, a symbol representative of a donation amount is affixed to a key pad 890, e.g. $1.

It will be appreciated that most credit card 145 donation amounts will not require an authorization by signature or numeric code. Consequently, in one embodiment, the present invention contemplates that a contributor will simply need to swipe or insert card 145/150 through card processor 160/240 and enter the amount of his donation by pressing a key associated with a cash denomination on key pad 890. In an alternate embodiment, key pad 890 is a standard key pad. In an alternate embodiment, the present invention contemplates that a contributor will have pre-authorized the charitable organization to collect a donation amount. Pre-authorization might include an agreement with the organization that a contributor authorizes the donation of a given amount once a certain action takes place, i.e. the contributor swipes or inserts card 145/150 into or through card processor 160/240 at a donation kettle 100.

In the case of a debit card 150 donation via a donation kettle 100, the contributor might authorize the charitable organization to use a secret identification number associated with his debit card account in order to allow the organization to automatically obtain the donation without seeking subsequent authorization from the contributor. In this scenario, the contributor need only perform the action of swiping or inserting card 150 through processor 160/240 on donation kettle 100 to make a donation.

The present invention also contemplates that a contributor might wish not to disclose a contributor's card 145/150 account authorization code to the charitable organization for security reasons but still might wish to make a card 145/150 donation. In this case, the present invention contemplates that the donation kettle 100 has an input that allows for entry of the contributor's card 145/150 account authorization code. An advantage of this feature is added security for the contributor.

The present invention also contemplates the addition of sound board circuitry (not pictured), and speaker 1993 (See, e.g. the additions described in FIG. 1a). By way of example, a sound board, such as a Sound Blaster$^R$ board may be commercially obtained from Creative Labs located in California. After a contributor makes a donation a message is conveyed via sound board circuitry and speaker 1993. The sound of a bell, and also other messages, may also be conveyed via sound board circuitry and speaker 1993 to attract contributors. In an alternate embodiment, a donation kettle 100 and its related circuitry incorporates a CD Rom player as an addition.

Figure 2A:
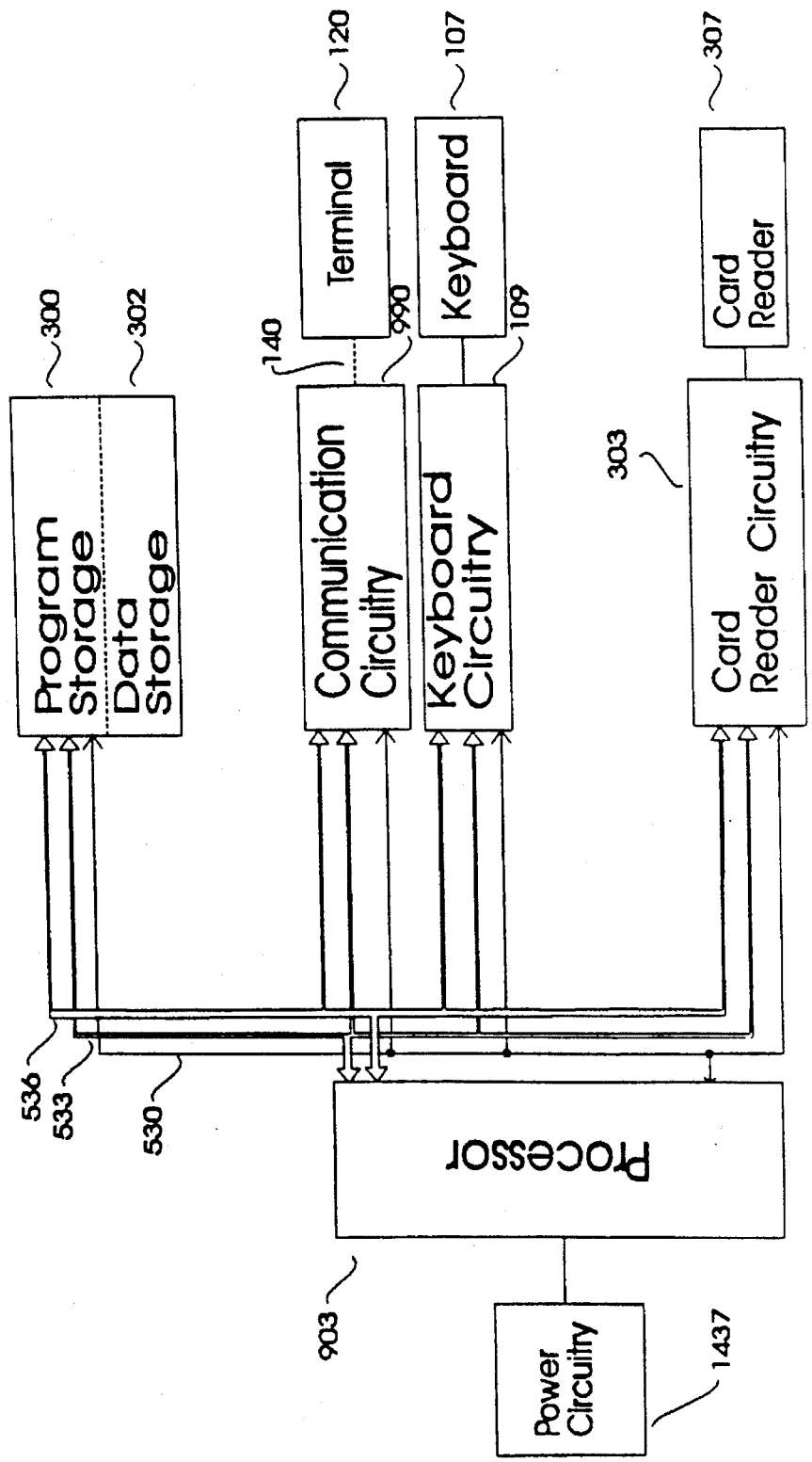
FIG. 2a is a schematic block diagram of an embodiment of a donation kettle with a card reader and associated circuitry, communication circuitry, a keyboard and associated circuitry.
Figure 2B:
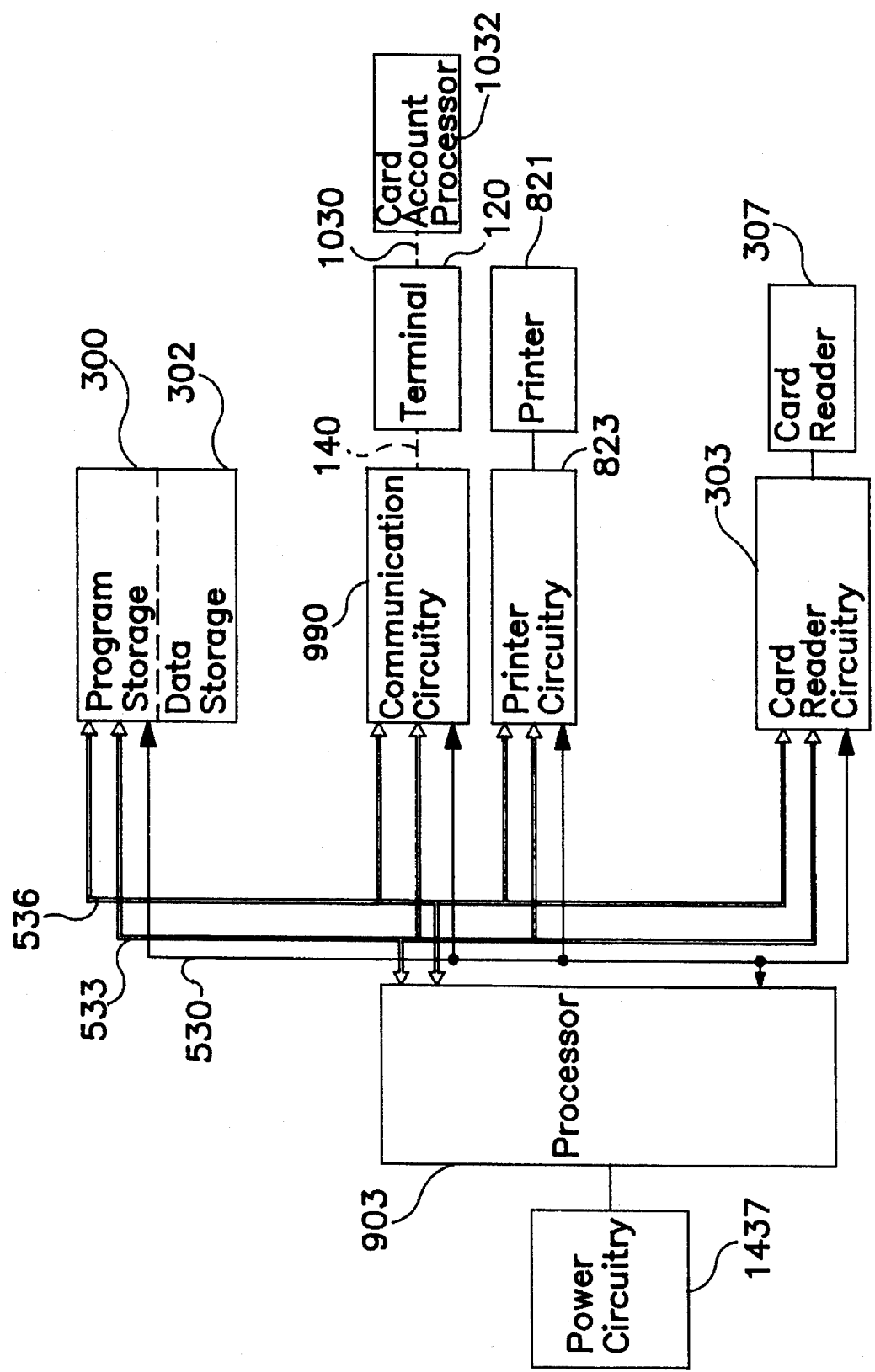
FIG. 2b is a schematic block diagram of one embodiment of a donation kettle with a card reader and associated circuitry, communication circuitry, a receipt generator (a printer and associated circuitry), a terminal, and a card account processor database.

FIG. 2a is a schematic block diagram of one embodiment of a donation kettle 100 with a card reader 307 and associated circuitry 303, communication circuitry 990, a keyboard 107 and associated circuitry 109. This embodiment has the features described generally in FIG. 1a above as well as other features that will be described below.

Generally in all embodiments where a keyboard is present, keyboard circuitry 109 scans keyboard 107 to determine if a key has been hit. Keyboard 107 refers to keypad 890 and/or an entry key (not pictured).

Key board 107 might include a cancel key, an enter key, and/or keys with other alpha-numeric text. In another embodiment, keyboard 107 might contain a key that represents a specific denomination amount, e.g. five dollars ($5) or ten dollars ($10). In another embodiment, keyboard 107 is a programmable keyboard where the denomination represented by a key can be altered for a particular donation session. Hence, an exemplary keyboard layout, i.e. $1, $5, and $10, might be programmed to be $5, $10, and $15. Processing circuitry 903 interfaces with keyboard 107 and associated circuitry 109 via an address bus 536, data bus 533, and control bus 530.

In an alternate embodiment, a key on keyboard 107 might be representative of text. By way of example, a key might represent a particular charity to which the donation is made, and/or a fund within a charity to which a donation is made.

Once a key has been hit on keyboard 107, that key information is moved into a buffer and interrupts processing circuitry 903 to communicate that the key is ready. Circuitry 903 responds to the interrupt by reading the buffered keyboard information. Circuitry 903 then stores the keyboard information in storage 302 if necessary. By way of further example, the keyboard information may consist of a donation amount, an account number of a contributor, an authorization code, and the like.

In one embodiment, keyboard circuitry 109 interrupts processing circuitry 903. Circuitry 903 responds to the interrupt by reading buffered keyboard information, which by way of example, includes donation information and/or card account information concerning the fund to which the donation is made. Circuitry 903 then associates the information via a software routine in one embodiment, and stores the associated information in storage 302. In another embodiment, circuitry 903 takes the associated information and transfers it from storage to a card account processor database.

In one exemplary embodiment, a donation kettle 100 contains a card reader 307 and related circuitry 303 addition. Card reader 307 and related circuitry 303 reads information on a card 145, 150 (FIG. 2) and converts card information to a digital sequence of 1's and 0's which correspond to the card information thereon, and stores this information in a buffer. Card reader circuitry 303 interrupts processor 903 and communicates card information to processing circuitry 903. Processing circuitry 903 interfaces with card reader 307 and associated circuitry 303 via an address bus 536, data bus 533, and control bus 530. Specifically, upon detection by reader 307 that a card 145/150 donation is being made, card reader circuitry 303 interrupts processing circuitry 903. Circuitry 903 responds to the interrupt by reading the buffered card information. Buffered card information includes contributor and account information in one embodiment. The card reader might include a reader that reads a magnetically striped card, an IC card, a PCMCIA card, or the like.

FIG. 2b is a schematic block diagram of one embodiment of a donation kettle 100 with a card reader 307 and associated circuitry 303, communication circuitry 990, a receipt generator (a printer 821 and associated circuitry 823). This embodiment has the features generally described herein, as well as those described below.

Preferably, a receipt generator (a printer 821 and associated circuitry 823) is located on or near a donation kettle 100. In an alternate embodiment, the receipt generator may be located at a remote location. The receipt generator produces a receipt for a single donation or a plurality of donations. In one embodiment, a donation kettle 100 communicates, via a communication link, preferably an RF (radio frequency) communication link or an infra-red communication link, with the receipt generator. In another embodiment, a donation kettle 100 communicates donation and contributor information, via a communication link to terminal 120. Terminal 120 then communicates the contributor and donation information to the receipt generator. The communication consists of information about the contributor, the donation, the date, the intention for which the donation was given, and the like. The receipt generator processes the information about the contributor and the donation to generate a receipt. The receipt may be generated automatically by the receipt generator to be picked up by the contributor at or soon after visiting the donation kettle 100, or may be generated for mailing or faxing to the contributor. A contributor of a charitable organization may desire the receipt for tax purposes.

Printer 821 is a thermal printer in one embodiment. In an alternate embodiment, printer 821 is a dot matrix printer, a laser printer, and the like.

Figure 3:
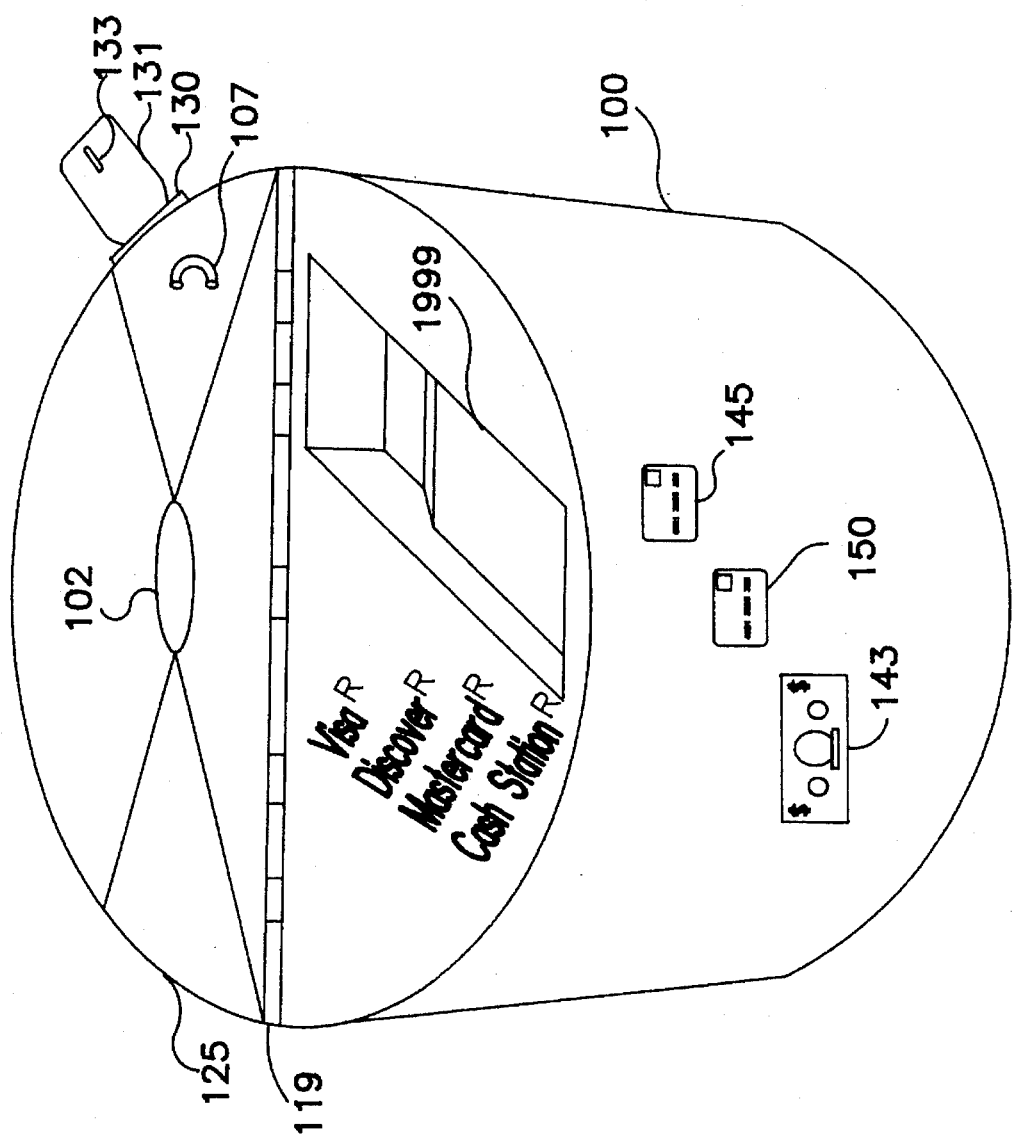
FIG. 3 is a perspective view of an embodiment of an exemplary donation kettle with a card donation processor docking station, a card donation processor with a keyboard, and a display, a terminal, a cash donation, a credit card donation, a debit card donation, and a locking assembly.
Figure 3:
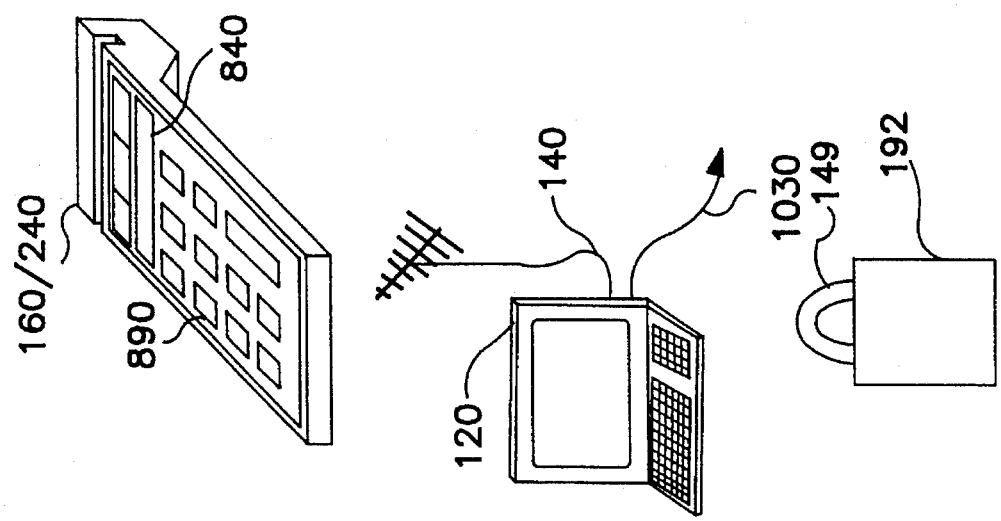

FIG. 3 is a perspective view of an embodiment of a donation kettle 100 with a card donation processor docking station 1999, a card donation processor 160/240, a keyboard 890, a display 840, terminal 120, a cash donation 143, a credit card donation 145, and a debit card donation 150. This donation kettle 100 has the features described above, with the addition of a donation kettle docking station 1999.

Donation kettle docking station 1999 allows for a card donation processor 160/240 to be docked. In one embodiment card donation processor 160/240 is communicatively attached to docking station 1999 to allow card account and/or contributor information to be transmitted via docking station 1999 to, by way of example, terminal 120 (via communication link 140), to a card account processor directly via communication link 140), to another donation kettle 100, and/or a combination thereof. In one embodiment a plurality of docking stations 1999 are networked.

Docking station 1999 can also be used to communicatively attach a card reader 307 and related circuitry 303 (FIG. 2b) to a donation kettle 100. Moreover, a donation kettle 100 docking station 1999 may also be located on the interior or exterior of a building and/or a permanently mounted donation kettle stand 153 (FIG. 2).

In one embodiment, docking station 1999 provides a means for the power source 1437 of card reader 307 and related circuitry 303 (FIG. 2a) to be energized or recharged. In another embodiment, docking station 1999 provides a communication link between card reader 307 and related circuitry 303 (FIG. 2b) and/or a card account processor.

In another embodiment docking station 1999 includes a slide in mounting unit (not pictured) in a donation kettle 100 onto which a card processor 160/240 is connected. In an embodiment, card processor 160/240 slides into docking station 1999, and plugs into the docking station 1999. In an alternate embodiment, docking station 1999, and/or a card processor 160/240 contain a base mount (not pictured). The base mount includes a plate on the bottom or side of card donation processor 160/240 (not pictured). In one embodiment, the plate is offset from the bottom of card processor 160/240. The plate allows card processor 160/240 to slide into docking station 1999.

In an alternate embodiment, card processor 160/240 is permanently mounted in docking station 1999. In an alternate embodiment docking station 1999 acts as a surface on which a portable card processor 160/240 rests without an electrical connection. Processor 160/240 is taken from the docking station 1999 surface after a donation session and linked to a card account processor database via a communication link. In one embodiment, docking station 1999 can be molded into the body of donation kettle 100.

In yet another embodiment, card processor 160/240, and/or docking station 1999 contains an electrical connector (not pictured) that provides sufficient connection to provide a communication link to move data. Numerous communication links discussed above can also be used to provide connections to move data.

In various embodiments, docking station 1999, terminal 120, card processor 160/240 or a combination thereof are on the same network. Downloading information from the devices on the network is directed to a terminal 120 in one embodiment, to a modem in another embodiment, or to a card account processor database in yet another embodiment.

In an embodiment, a hinge 119 is provided. Hinge 119 allows surface 125 to pivot along the hinge axis. When surface 125 is raised, access to the center retaining area 200 (FIG. 5) of donation kettle 100 is allowed.

A locking assembly consists of a hinge 130, a surface 131 on which slot 133 is disposed, a loop member 137, and padlock 192. Surface 131 pivots along the axis of hinge 130. In one position loop 137 penetrates slot 133. Loop member 149 on padlock 192 goes through loop member 137 allowing surface 125 to be secured. The present invention also contemplates the use of other forms of locking assemblies commonly known in the art.

Figure 3A:
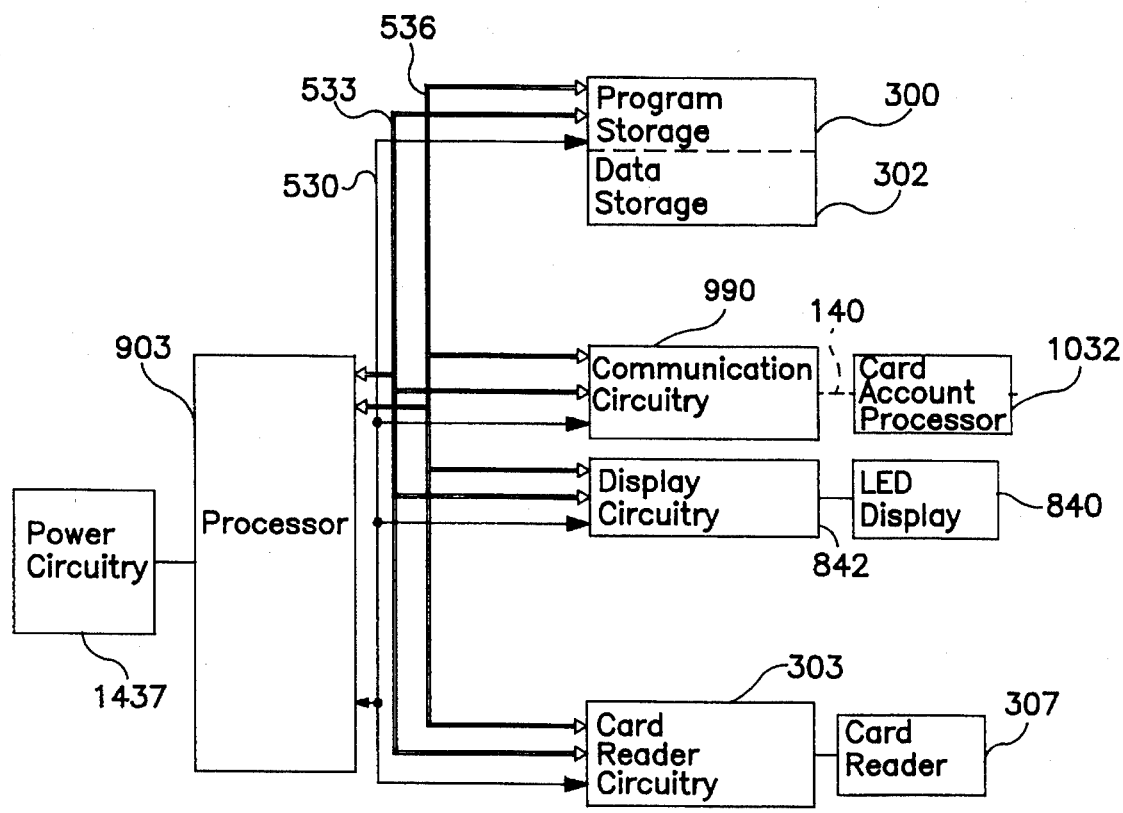
FIG. 3a a schematic block diagram of one embodiment of a donation kettle with communication circuitry, a display and associated circuitry, a card account processor database.

FIG. 3a a schematic block diagram of one embodiment of a donation kettle 100 with card reader 307 and associated circuitry 303, communication circuitry 990, a display 840 and associated circuitry 842. This embodiment includes communication link 140. Communication link 140 allows information to be communicated to a card account processor database 1032. In one embodiment, card account processor 1032 database receives card account information and/or donation amount information from a single card reader 307 and associated circuitry 303. In an alternate embodiment, card account processor 1032 database receives card account information and/or donation amount information from a networked group of card readers 307 and associated circuitry.

Figure 4:
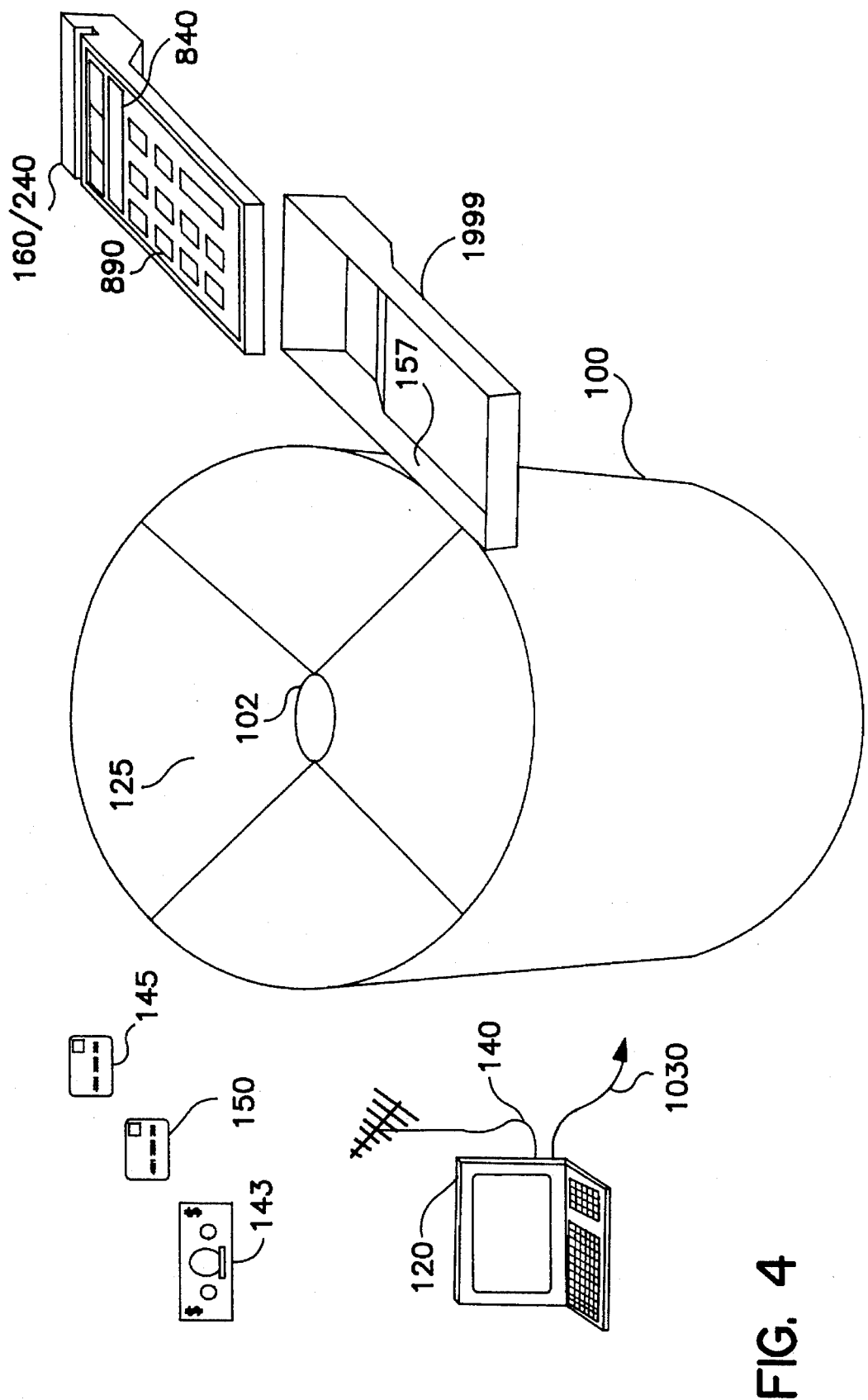
FIG. 4 is a perspective view of an embodiment of an exemplary donation kettle, a slot for accepting cash and/or a coin donation, a card donation processor docking station, a card donation processor with a keyboard and a display, a terminal, a cash donation, a credit card donation, and a debit card donation.

FIG. 4 is a perspective view of an embodiment of an exemplary donation kettle 100 with a card donation processor docking station 1999, a card donation processor 160/240, a keyboard 890, a display 840, surface 125 containing slot 102, terminal 120, a cash donation 143, a credit card donation 145, and a debit card donation 150. This exemplary donation kettle 100 has the features described herein, with the addition of a donation plate docking station 1999 located on the side of donation kettle 100.

Docking station 1999 is constructed of plastic, metal, wood, or any other material appropriate to create a surface on which card donation processor 160/240 rests. Docking station 1999 is fastened to the side of donation kettle via fastening means 157. By way of example, fastening means 157 includes adhesive, rivets, snaps, velcro, or screws. It will be appreciated that this embodiment of the invention allows a donation kettle 100 to be retrofitted with card account processor 160/240 in order to allow card 145/150 donations to be obtained. In an alternate embodiment card processor 160/240 includes a clip (not pictured) or other appendage (not pictured) allowing for the card processor 160/240 to be mounted to donation kettle 100.

Similarly, docking station 1999 as described in these embodiment can also be used with a worship terminal described in U.S. application, Ser. No. 08/194,204 filed Feb. 8, 1994, and an offering plate described in U.S. application, Ser. No. 08/127,770, filed Sep. 28, 1993, which is a continuation-in-part of U.S. application, Ser. No. 08/117,909, filed Sep. 7, 1993, by Witold A. Ziarno.

Figure 5:
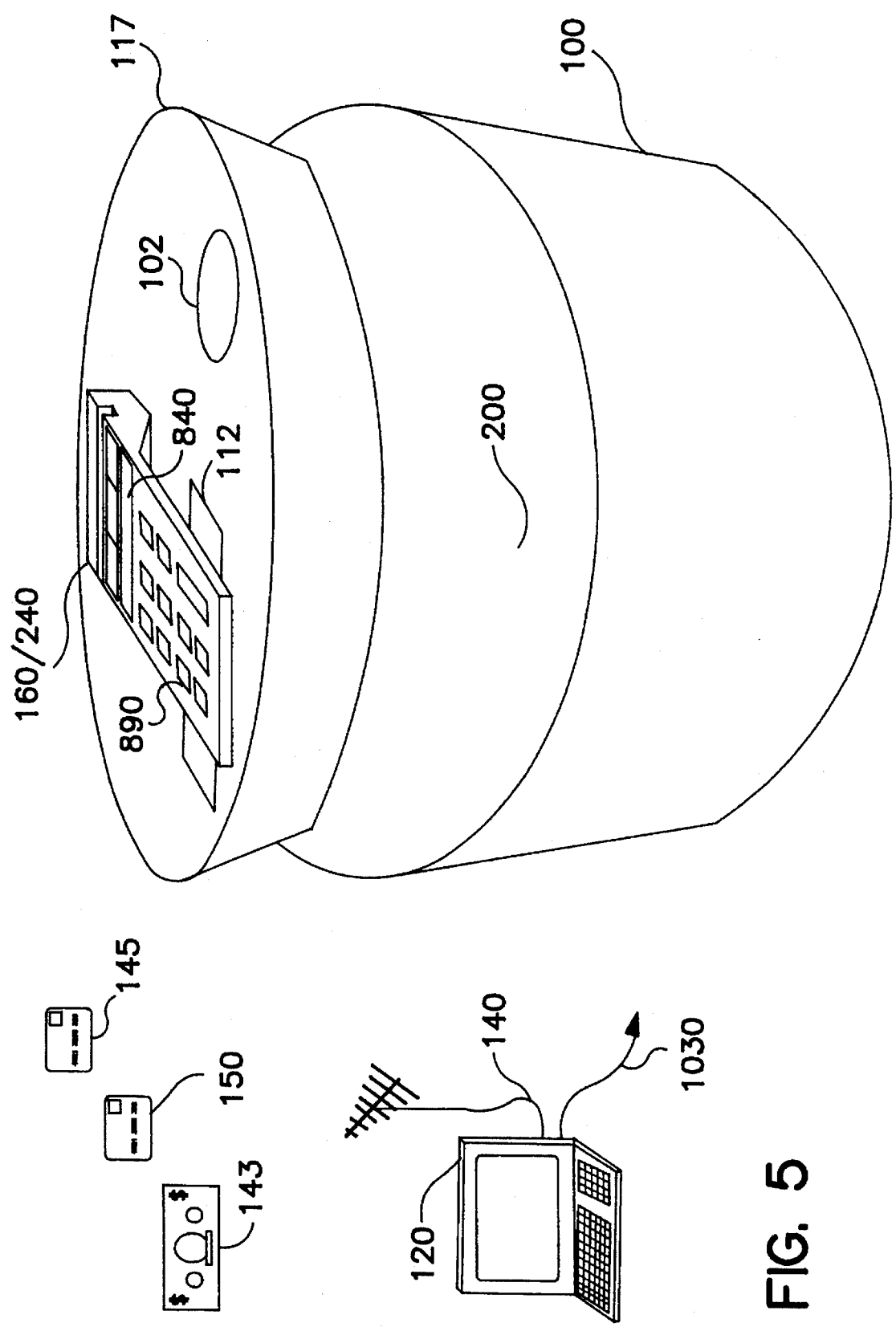
FIG. 5 is a perspective view of an embodiment of an exemplary donation kettle, and a removable surface containing a card donation processor, a means for mounting a card donation processor on the surface, a slot for accepting cash and coin donations, and a credit card, debit card, and cash donation.

FIG. 5 is a perspective view of an embodiment of an exemplary donation kettle 100 with surface 117, a card processor 160/240, a velcro member 112, and a slot 102. Kettle 100 has the features described herein.

In this embodiment, donation plate 100 has added to it a surface 117. Surface 117 contains a slot 102 into which cash 143 or a coin donation (not pictured) can be donated. Surface 117 acts as a barrier to theft and can be mounted permanently on donation kettle 100 in one embodiment. Surface 117 can be constructed from metal, wood, or any other material appropriate to act as a theft deterring barrier.

In an alternate embodiment, surface 117 is removable. The side wall of surface 117 and the inner side wall of donation kettle 100 is threaded, allowing for surface 117 to screw into kettle 100. In yet another embodiment, surface 117 is fastened to kettle 100 by means of snaps, screws, or a combination thereof.

Velcro surface 112 comes into contact with a sister velcro surface (not pictured) on the underside of card processor 160/240. This contact allows for card processor 160/240 to be removably mounted to surface 117.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

I claim:

1. A donation collection device for the making of sequential contributions from a plurality of successive contributors comprising, in combination:

a portable, donation-receiving kettle movable manually from one location to another at will for receiving monetary contributions therein at different locations;

an electronic contributions management terminal mounted on said kettle for carrying the terminal thereon from one location to another and making a plurality of successive monetary donations thereon by donors who are cardholders of respective credit cards and debit cards and without resort to verification of prior authorization by a credit card and debit card processing organization;

said terminal having its own source of energy;

a card reader on said terminal for reading indicia on individual credit cards and debit cards presented thereto for identifying a respective cardholder making a corresponding monetary contribution on the terminal;

said terminal having a user interface having manually activated operators accessible from externally of said kettle for individual cardholders or others acting for individual cardholders for designating and entering immediately a respective amount of a monetary contribution in said terminal by activation of respective manually-activated operators;

means for immediately recording and storing data sets comprised of the contribution information of each designated amount of the monetary contributions correlated with information read by the card reader identifying the respective cardholders acting as donors for corresponding monetary contributions;

means in said terminal for off-loading the data sets comprised of contribution information stored in the terminal after a multiplicity of donations have been recorded therein; and means comprised of a docking station attached to said donation-receiving kettle for receiving said terminal therein and positioning said terminal for use and form permitting said terminal to be removed therefrom; and means for attaching said docking station to said donation-receiving kettle.

2. A donation collection device according to claim 1, in which said kettle comprises means for receiving therein envelopes having currency donations therein.

3. A donation collection device according to claim 2, having means for off-loading said envelopes therein.

4. A donation collection device according to claim 1, including means for linking said terminal with another different terminal for off-loading said information to said different terminal for processing of said information.

5. A donation collection system for making sequential contributions by a plurality of successive contributors comprising:

said system comprising a plurality of collection devices, said devices comprising in combination;

a plurality of portable donation-receiving kettles movable manually from one location to another at will for receiving a plurality of successive data sets comprised of monetary contributions therein at different locations;

each kettle comprising an electronic contribution management terminal mounted on a corresponding kettle for moving of the respective terminal from one location to another when a corresponding kettle is moved from one location to another and making of monetary donations thereon by successive donors who are cardholders of respective credit cards and debit cards and without resort to request for verification of prior authorization;

each said terminal having its own source of energy;

each terminal having a card reader for reading indicia on individual credit cards and debit cards presented thereto for identifying a respective cardholder making a corresponding monetary contribution on the terminal;

each terminal having a user interface having manually activated operators accessible from externally of the kettle for individual cardholders or others acting for individual cardholders for designating and entering a respective amount of a monetary contribution in the terminal by activation of respective manually-activated operators;

means in each terminal for recording and storing immediately information of each designated amount of the monetary contributions made thereon correlated with information read by the card reader thereof identifying the respective cardholders acting as donors for corresponding monetary contributions;

each terminal having means for off-loading the data sets comprised of contribution information recorded and stored in the respective terminal after a multiplicity of data sets comprised of donations have been recorded therein;

means comprised of a docking station attached to said donation-receiving kettle for receiving said terminal therein and positioning said terminal for use and for permitting said terminal to be removed therefrom; and means for attaching said docking station to said donation receiving kettle.

6. A donation collections system according to claim 5, including another terminal for receiving data sets comprised of contribution information off-loaded from said terminals of said donation collection devices for processing of said information; and means for linking individual donation collection devices to said another terminal for off-loading said data sets comprised of contribution information from individual donation collection devices to said another terminal.

7. A donations collection system according to claim 6, in which said means for linking comprises a wireless communication link for linking remote donation collection devices to said another terminal for transmission of information off-loaded from said donation collection devices to said another terminal.

8. A donations collection system according to claim 7, including means for entering respective debits and credits of said corresponding contribution amounts to accounts of respective donors and a recipient of said contribution amounts.

9. A method of inducing and simplifying successive monetary contributions to a charitable organization immediately recording thereof upon making of the monetary contributions comprising:

providing a multiplicity of electronic donation kettles movable manually from one location to another at will at a plurality of different locations for making individual monetary contributions, each kettle comprising a portable monetary contributions management terminal having its own electrical energy source, and manually operable operators for sequentially making monetary contributions without the interruption of authorization, means comprised of a docking station attached to said kettle for receiving said terminal therein and positioning said terminal for use and for permitting said terminal to be removed therefrom, and means for attaching said docking station to said kettle;

presenting to respective terminals card record mediums and reading electronically indicia thereon indicative of the card holder of the card corresponding to a designated monetary amount and recording in the terminals a sequence of data sets comprised of contribution information representative of said indicia correlated to said indicia representative of the respective contributions; and, the card medium constituting a card record medium issued by an organization and constituting pre-authorization by said organization for card record medium monetary transaction commitments made by a respective card record medium cardholder, wherein a multiplicity of individual contributions by corresponding contributors are readily recorded and stored in the respective terminals;

entering manually information of a designated monetary contribution in the terminals by individual contributors or individuals acting on behalf of individual contributors; and, recording and storing for future off-loading in the terminals the data sets comprised of the information of the contributions made.

10. A method according to claim 9, further comprising the steps of establishing a wireless communication link between the terminals and another terminal for off-loading information received and stored in said terminals of a multiplicity of contributions, and recording the information at another terminal.

11. A method according to claim 10, further comprising the steps of off-loading said information from said terminals to the other terminal and transmitting a request for authorizations of the multiplicity of monetary contributions from said another terminal to a funds processing network.

12. A method according to claim 9, further comprising the steps of processing said contribution information and forwarding records of the respective contribution transactions to the donors making the respective transactions for substantiating tax deductions or contribution quotas.

* * * * *